(12) United States Patent
Sun

(10) Patent No.: US 11,648,716 B2
(45) Date of Patent: May 16, 2023

(54) SURFACE CLEANING ROBOT AND PROCESS FOR MANUFACTURING TRACK THEREOF

(71) Applicant: ECOVACS ROBOTICS CO., LTD., Suzhou (CN)

(72) Inventor: Qi Sun, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 231 days.

(21) Appl. No.: 16/467,300

(22) PCT Filed: Dec. 7, 2017

(86) PCT No.: PCT/CN2017/114934
§ 371 (c)(1),
(2) Date: Jun. 6, 2019

(87) PCT Pub. No.: WO2018/103683
PCT Pub. Date: Jun. 14, 2018

(65) Prior Publication Data
US 2020/0061884 A1    Feb. 27, 2020

(30) Foreign Application Priority Data
Dec. 7, 2016 (CN) .......................... 201611114372.2

(51) Int. Cl.
*A47L 1/02* (2006.01)
*B62D 55/24* (2006.01)
(Continued)

(52) U.S. Cl.
CPC ................ *B29C 45/14* (2013.01); *A47L 1/02* (2013.01); *B25J 5/005* (2013.01); *B25J 11/0085* (2013.01);
(Continued)

(58) Field of Classification Search
CPC ...... B62D 55/08; B62D 55/24; B62D 55/242; B62D 55/244; B62D 55/125; B62D 55/14;
(Continued)

(56) References Cited

U.S. PATENT DOCUMENTS 3,781,067 A * 12/1973 Dodson ................ B62D 55/244
305/168
4,546,842 A * 10/1985 Yasui ..................... B62D 55/07
180/193
(Continued)

FOREIGN PATENT DOCUMENTS

CN         1880398 A       12/2006
CN       201399240 Y        2/2010
(Continued)

OTHER PUBLICATIONS

EP Search Report in Application No. 17877757.9 dated Aug. 21, 2020.
(Continued)

*Primary Examiner* — Anne Marie M Boehler
(74) *Attorney, Agent, or Firm* — Maschoff Brennan

(57) ABSTRACT

Disclosed is a surface cleaning robot and a process for manufacturing a track thereof. The surface cleaning robot includes a body, where a walking unit is provided at the bottom of the body, the walking unit includes a track and a gear driving the track, the track includes a hard layer in the inner ring engaging with the gear and a soft layer in the outer ring contacting a cleaning surface, and the hard layer and the soft layer are nested and combined as a whole. The present disclosure adopts a composite track that closely nests and combines inner and outer rings of different materials.

8 Claims, 3 Drawing Sheets

(51) Int. Cl.
  B62D 55/08 (2006.01)
  B29C 45/73 (2006.01)
  B29C 45/74 (2006.01)
  B29C 45/14 (2006.01)
  B25J 5/00 (2006.01)
  B25J 11/00 (2006.01)
  B29L 29/00 (2006.01)

(52) U.S. Cl.
  CPC .............. *B29C 45/73* (2013.01); *B29C 45/74* (2013.01); *B62D 55/08* (2013.01); *B62D 55/24* (2013.01); *B29L 2029/00* (2013.01)

(58) Field of Classification Search
  CPC ....... B62D 55/06; B29L 2029/00; A47L 1/02; B25J 11/0085; B25J 5/005; B29C 45/14; B29C 49/73; B29C 45/74
  USPC ........................................................ 305/166
  See application file for complete search history.

(56) References Cited

U.S. PATENT DOCUMENTS

| | | | | |
|---|---|---|---|---|
| 5,368,376 | A * | 11/1994 | Edwards | B62D 55/24 305/167 |
| 6,769,746 | B2 * | 8/2004 | Rodgers | B62D 55/244 305/165 |
| 6,932,442 | B2 * | 8/2005 | Hori | B62D 55/244 305/167 |
| 7,578,565 | B2 * | 8/2009 | Hirose | B62D 55/24 305/165 |
| 9,540,182 | B2 * | 1/2017 | Kim | B32B 25/042 |
| 10,730,572 | B1 * | 8/2020 | Lussier | B62D 55/125 |
| 2008/0136255 | A1 * | 6/2008 | Feldmann | B62D 55/244 305/167 |
| 2010/0139995 | A1 * | 6/2010 | Rudakevych | B62D 55/06 180/9.32 |
| 2011/0240382 | A1 | 10/2011 | Gettings et al. | |
| 2015/0026909 | A1 | 1/2015 | Baek et al. | |
| 2015/0257622 | A1 | 9/2015 | Qian | |
| 2016/0039483 | A1 * | 2/2016 | Nielsen | B62D 55/075 180/164 |
| 2018/0327036 | A1 * | 11/2018 | Dandurand | B62D 55/244 |
| 2019/0054672 | A1 * | 2/2019 | Kajihara | B32B 7/04 |

FOREIGN PATENT DOCUMENTS

| | | |
|---|---|---|
| CN | 203802380 U | 9/2014 |
| CN | 104210570 A | 12/2014 |
| CN | 104709371 A | 6/2015 |
| CN | 105176065 A | 12/2015 |
| CN | 105212822 A | 1/2016 |
| CN | 105962858 A | 9/2016 |
| CN | 106961594 A | 7/2017 |
| CN | 206576813 U | 10/2017 |
| WO | 2006/089307 A1 | 8/2006 |
| WO | 2013/169312 A1 | 11/2013 |

OTHER PUBLICATIONS

EP Search Report in Application. No. 17877757.9 dated Mar. 25, 2020.

* cited by examiner

SURFACE CLEANING ROBOT AND PROCESS FOR MANUFACTURING TRACK THEREOF

FIELD

The present disclosure relates to a surface cleaning robot and a process for manufacturing the track thereof.

BACKGROUND

Existing surface cleaning robots, such as a window-wiping robot, typically employ a track-type walking mechanism to facilitate walking on a glass surface. The window-wiping robot is vertically attached to the glass surface of the window body by the negative pressure generated by the fan, and then moves freely on the glass surface by a track mounted on the bottom of the window-wiping robot. However, the existing track has relatively single structure and high requirements for materials, i.e., if a high-hardness material is adopted, the track has poor adhesion to the glass and can damage the glass; well if a low-hardness material is adopted, the side of the track where the track engages with a gear is particularly susceptible to wear-out failure. At present, there is also a composite track consisting of at least two tapes with different hardness which are superposed with each other and has gradually enhanced hardness from the outer ring to the inner ring. This composite track solves the above-mentioned problem, but relative displacements between the different tapes tend to occur after a long run, resulting in failure of the track.

SUMMARY

Regarding the technical problem to be solved, the present disclosure provides a surface cleaning robot and a process for manufacturing the track thereof, which adopts a composite track that closely nests and combines inner and outer rings of different materials. The process is simple and easy, but greatly increases the overall strength and toughness of the track, overcomes the problem of poor walking capacity of the track on the cleaning surfaces, thereby enhancing the working safety of the surface cleaning robot and reducing the production cost. The structure is simple and easy to manufacture, has wide application, and has the advantages of the synchronous belt, the cleaning efficiency and service life of the surface cleaning robot are also improved.

These and other example problems may be solved by the following technical solution of the present disclosure.

A surface cleaning robot, including a body, where a walking unit is provided at the bottom of the body, the walking unit includes a track and a gear driving the track, the track includes a hard layer in the inner ring engaging with the gear and a soft layer in the outer ring contacting a cleaning surface, and the hard layer and the soft layer are nested and combined as a whole.

Additionally or alternatively, in order to maintain effective fixation between the hard layer and the soft layer when subjected to frictional resistance, a plurality of protrusions are provided on the outer side of the hard layer, and the protrusions are embedded in the soft layer so that the soft layer and the hard layer are nested with each other.

In order to further enhance the fixation, the hard layer is wave-shaped, the inner side of the hard layer is engaged with the gear, and the soft layer coats on the outer side of the hard layer.

Additionally or alternatively, the protrusions are T-shaped, Y-shaped, or barb-shaped.

In addition, the hard layer may be provided with a hole, and the soft layer is embedded into the hole so that the soft layer and the hard layer are nested with each other.

Additionally or alternatively, in order to protect the track, two semi-shells that are fastened to each other are provided outside the track, and a reducer is also provided between a driving motor and the gear.

The soft layer is made of thermoplastic polyurethane rubber or polyvinyl chloride as needed, and the hard layer is made of nylon glass fiber or thermoplastic polyester elastomer.

The present disclosure also provides a process for manufacturing track, the track comprising a hard layer in the inner ring engaging with the gear and a soft layer in the outer ring contacting a cleaning surface, the hard layer and the soft layer being nested and combined as a whole, the process for manufacturing the track specifically including:

step 100: heating the soft layer to melt it into a liquid state;

step 200: evenly injecting the liquid-state soft layer into a mold filled with the hard layer so that the soft layer covers the outer side of the hard layer; and step 300: cooling the hard layer and the soft layer so that they are nested and combined with each other, and demolding.

Additionally or alternatively, in one of the embodiments of the present disclosure, further includes step 001 prior to the step 100: integrally forming a plurality of protrusions on the outer side of the hard layer for nesting and combining the soft layer and the hard layer.

In another embodiment of the present disclosure, further includes a step 110 after the step 100 and prior to the step 200: providing a hole on the hard layer. The step 200 specifically includes coating the soft layer on the outer side of the hard layer and embedding the soft layer into the hole provided on the hard layer.

Additionally or alternatively, a heating process parameter in the step 100 includes a heating temperature of 150° C. to 160° C. to melt the soft layer into a liquid state.

A cooling process parameter in the step 300 includes a cooling temperature of 20° C. to 50° C. and a cooling time of 30 seconds to 50 seconds.

In conclusion, the present disclosure provides a surface cleaning robot and a process for manufacturing the track thereof, which adopts a composite track that closely nests and combines inner and outer rings of different materials. The process is simple and easy, but greatly increases the overall strength and toughness of the track, overcomes the problem of poor walking capacity of the track on the cleaning surface, thereby enhancing the working safety of the surface cleaning robot and reducing the production cost. The structure is simple and easy to manufacture, has wide application, and has the advantages of the synchronous belt, the cleaning efficiency and service life of the surface cleaning robot are also improved.

Hereinafter, the technical solution of the present disclosure will be described in detail below in connection with the accompanying drawings and specific embodiments.

DETAILED DESCRIPTION OF EXAMPLE EMBODIMENTS

Figure 1:
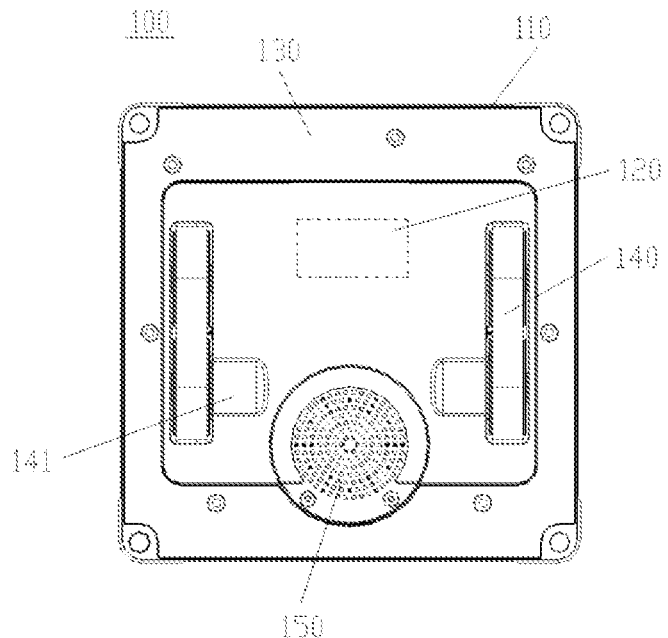
FIG. 1 is a schematic diagram showing an overall structure of a surface cleaning robot according to the present disclosure.
Figure 2:
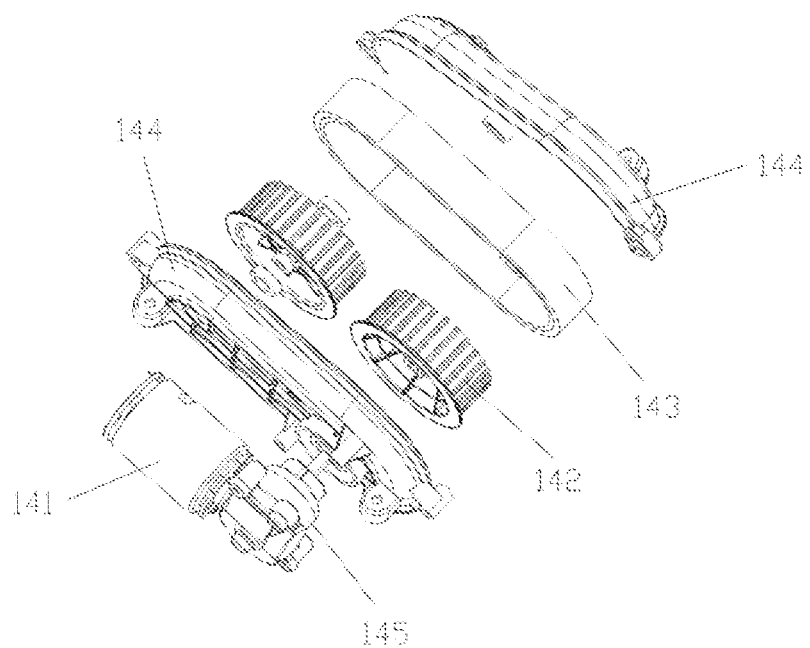
FIG. 2 is an exploded view of a partial structure of a walking unit according to the present disclosure.
Figure 3:
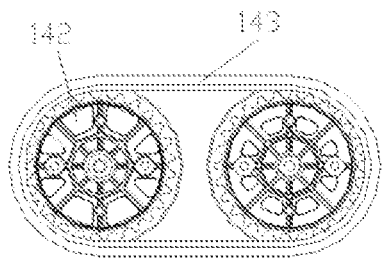
FIG. 3 is a schematic diagram showing a connection structure of a track and a gear according to the present disclosure.

FIG. 1 is a schematic diagram showing the overall structure of the surface cleaning robot of the present disclosure. For example, as shown in FIG. 1, the present disclosure provides a surface cleaning robot 100, which may be specifically a window-wiping robot including a body 110. The body 110 is provided with a control unit 120 controlling the cleaning and movement of the robot, a cleaning unit 130 cleaning the window body, a walking unit 140 driving movement of the robot, and an attachment unit 150 causing the surface cleaning robot to be attached on the surface of the window body. FIG. 2 is an exploded view of a partial structure of a walking unit according to the present disclosure, and FIG. 3 is a schematic view of a connection structure between a track and a drive wheel according to the present disclosure. For example, as shown in FIG. 2 and FIG. 3 and in conjunction with FIG. 1, the walking unit 140 includes a driving motor 141 provided in the body 110, a gear 142 driven and rotated by the driving motor 141, and a track 143 driven around the gear 142. In the present embodiment, in order to effectively protect the track 143, two semi-shells 144 that are fastened to each other are provided outside the track 143, and the track is exposed below the semi-shells. Further, in order to facilitate the control of the moving speed of the surface cleaning robot, a reducer 145 is provided between the driving motor 141 and the gear 142.

Figure 4:
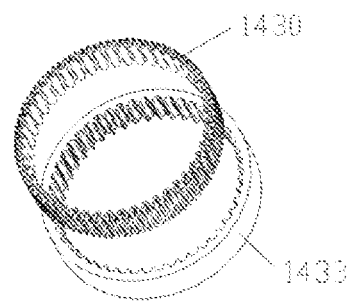
FIG. 4 is a schematic view of a track decomposition structure according to the present disclosure.
Figure 5:
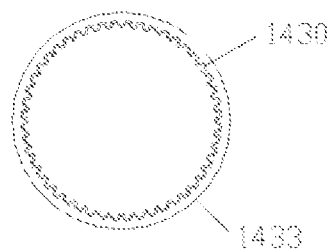
FIG. 5 is a schematic view of a track assembling structure according to the present disclosure.

FIG. 4 is a schematic view of a track disassembly structure according to the present disclosure, and FIG. 5 is a schematic view of a track assembly structure according to the present disclosure. For example, as shown in connection with FIG. 4 and FIG. 5, the track 143 includes a hard layer 1430 provided in the inner ring engaging with the gear 142 and a soft layer 1433 provided in the outer ring contacting the window surface, which are nested and combined as a whole. Additionally or alternatively, to enhance the fixation between the hard layer 1430 and the soft layer 1433, the hard layer 1430 is wave-shaped, the inner side of the hard layer 1430 is engaged with the gear 142, and the soft layer 1433 is nested with and coats on the outer side of the wave-shaped hard layer 1430. It should be noted that the side of the hard layer 1430 engaging with the gear 142 is the inner side of the hard layer 1430, while the outer side of the hard layer includes the other side of the hard layer 1430 other than the engagement side. Additionally or alternatively, the material of the track requires necessary explanation. The existing soft layer is usually made of silicone gel, while because both silicone gel and glass are silicon-based, residue of silicone gel on the glass appears to be a mark of friction. Therefore, the present disclosure adopts the principle of "external soft and internal hard", and the soft layer adopts a TPU (thermoplastic polyurethane rubber) instead of conventional silicone gel. Additionally or alternatively, the soft layer 1433 is made of thermoplastic polyurethane rubber, polyvinyl chloride, etc.; and the hard layer 1430 is made of nylon glass or thermoplastic polyester elastomer or hard plastic, etc. Meanwhile, the hard layer is made of the above-described materials, and has sufficient hardness to ensure long-term engagement with the gear. Due to the nested form of the present disclosure, the affinity (adhesive force) between different layers of material is no longer so important, so that the selection range of material is expanded.

The present disclosure further provides a process for manufacturing the above-described track, which specifically includes the following steps:

step 100: heating the soft layer to melt it into a liquid state, with a heating temperature of 150° C. to 160° C.;

step 200: evenly injecting the liquid-state soft layer into a mold filled with the hard layer, so that the soft layer covers the outer side of the hard layer; and step 300: cooling the hard layer and the soft layer so that they are nested and combined with each other, and demolding, with a cooling temperature of 20° C. to 50° C. and a cooling time of 30 seconds to 50 seconds.

As can be seen from the above processing process, in this embodiment the hard layer 1430 and the soft layer 1433 are nested and combined with each other, rather than holding them fixed by conventional adhesive resistance.

Figure 6:
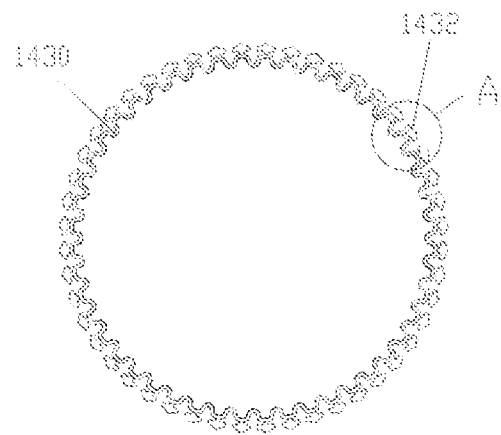
FIG. 6 is a schematic structural diagram of a hard layer of a track according to the present disclosure.
Figure 7:
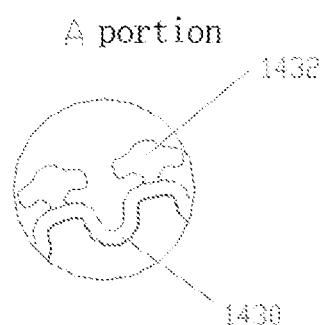
FIG. 7 is a partial enlarged view of part A of FIG. 6.

FIG. 6 is a schematic structural diagram of a hard layer of a track according to the present disclosure, and FIG. 7 is a partial enlarged view of part A of FIG. 6. For example, as shown in FIG. 6 and in conjunction with FIG. 7, in the present embodiment, in order to make the hard layer 1430 and the soft layer 1433 even tightly bonded, protrusions 1432 are provided on the outer side of the wave shape of the hard layer. For example, as shown in FIG. 7, in the present embodiment, the protrusions are T-shaped. During the operation of the surface robot 100 on the glass surface, the soft layer 1433 is held fixed to the hard layer 1430 by the resistance of the protrusions 1432 under friction resistance in the surface movement of the window.

The present disclosure further provides the process for manufacturing the above-described track, which specifically includes the following steps:

step 001: integrally forming a plurality of protrusions on the outer side of the hard layer for nesting and combining the soft layer and the hard layer with each other;

step 100: heating the soft layer to melt it into a liquid state, with a heating temperature of 150° C. to 160° C.;

step 200: evenly injecting the liquid-state soft layer into a mold filled with the hard layer, so that the soft layer covers the outer side of the hard layer;

step 300: cooling the hard layer and the soft layer so that they are nested and combined with each other, and demolding, with a cooling temperature of 20° C. to 50° C. and a cooling time of 30 seconds to 50 seconds.

Figure 8:
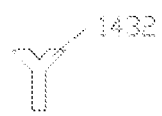
FIG. 8 is a schematic structural diagram of a protrusion according to the present disclosure.

FIG. 8 is a schematic view of a protrusion structure according to the present disclosure. For example, as shown in FIG. 8, the present embodiment is a structural replacement based on the above embodiment, and the only difference between the present embodiment and the above embodiment is the shape of the protrusions 1432. In the present embodiment, the protrusions 1432 are Y-shaped.

The other technical features of this embodiment are the same as those of the above embodiment described above and will not be described in detail here.

Figure 9:
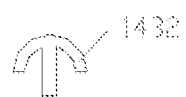
FIG. 9 is a schematic structural diagram of a protrusion according to the present disclosure.

FIG. 9 is a schematic view of a projection structure according to the present disclosure. For example, as shown in FIG. 9, the present embodiment is also a structural replacement on the basis of above embodiment, and the only difference between the embodiment and above embodiment is the shape of the protrusions 1432. In the present embodiment, the protrusions 1432 are barb-shaped.

The other technical features of this embodiment are the same as those of the above embodiment described above and will not be described in detail here.

The present embodiment is an improvement based on above embodiment and differs from above embodiment in that a number of holes are drilled on the outer side of the hard layer 1430 instead of providing additional protrusions on the hard layer 1430, so that mutual fixation between the soft layer and the hard layer is realized by embedding the soft layer 1433 into the holes, which also belongs to a nested fixing structure.

The other technical features of this embodiment are the same as those of the above embodiment described above and will not be described in detail here.

The present disclosure further provides the process for manufacturing the above-described track, which specifically includes the following steps:

step 100: heating the soft layer to melt it into a liquid state, with a heating temperature of 150° C. to 160° C.;

step 110: opening holes on the hard layer;

step 200: evenly injecting the liquid-state soft layer into a mold filled with the hard layer, so that the soft layer covers the outer side of the hard layer, the soft layer covering the outside of the hard layer and being embedded into holes formed on the hard layer;

step 300: cooling the hard layer and the soft layer so that they are nested and combined with each other, and demolding, with a cooling temperature of 20° C. to 50° C. and a cooling time of 30 seconds to 50 seconds.

It should be noted that the above-described nesting process is an even simpler and more mature process, compared with existing methods of inserting the inner and outer layers with fibers, or reinforcing the inner layer and the gear joint surface with fibers, what needs to do is only evenly coat the heated soft layer on the outer side of the hard layer and then cool it.

In conclusion, the present disclosure provides a surface cleaning robot and a process for manufacturing the track thereof, which adopts a composite track that closely nests and combines inner and outer rings of different materials. The process is simple and easy, but greatly increases the overall strength and toughness of the track, overcomes the problem of poor walking capacity of the track on the cleaning surfaces, thereby enhancing the working safety of the surface cleaning robot and reducing the production cost. The structure is simple and easy to manufacture, has wide application, and has the advantages of the synchronous belt, the cleaning efficiency and service life of the surface cleaning robot are also improved.

The invention claimed is:

1. A surface cleaning robot, comprising:
a body, wherein:
a walking unit is provided at a bottom of the body, the walking unit including a track and a gear driving the track; wherein the track surrounds an outside of the gear;
the track includes a hard layer in an inner ring engaging with the gear and a soft layer in an outer ring contacting a cleaning surface, wherein the hard layer has a wave-shaped outer side, a plurality of protrusions are provided on tops of waved parts of the wave-shaped outer side of the hard layer, the plurality of protrusions project away from the gear, and the soft layer covers the wave-shaped outer side of the hard layer and the protrusions provided thereon; and
the hard layer and the soft layer are nested and combined as a whole;
wherein the plurality of protrusions being provided on tops of waved parts of the wave-shaped outer side of the hard layer are Y-shaped.

2. The surface cleaning robot according to claim 1, wherein an inner side of the hard layer is engaged with the gear.

3. The surface cleaning robot according to claim 2, wherein:
two semi-shells that are fastened to each other are provided outside the track; and
a reducer is provided between a driving motor and the gear.

4. The surface cleaning robot according to claim 1, wherein:
two semi-shells that are fastened to each other are provided outside the track; and
a reducer is provided between a driving motor and the gear.

5. The surface cleaning robot according to claim 1, wherein the soft layer is made of thermoplastic polyurethane rubber or polyvinyl chloride.

6. The surface cleaning robot according to claim 5, wherein:
two semi-shells that are fastened to each other are provided outside the track; and
a reducer is provided between a driving motor and the gear.

7. The surface cleaning robot according to claim 1, wherein the hard layer is made of nylon glass fiber or thermoplastic polyester elastomer or hard plastic.

8. The surface cleaning robot according to claim 7, wherein:
two semi-shells that are fastened to each other are provided outside the track; and
a reducer is provided between a driving motor and the gear.

* * * * *